United States Patent [19]

Brown

[11] Patent Number: 4,787,210

[45] Date of Patent: Nov. 29, 1988

[54] BUS AIR CONDITIONING UNIT

[75] Inventor: Ronald W. Brown, New Hope, Minn.

[73] Assignee: Thermo King Corporation, Minneapolis, Minn.

[21] Appl. No.: 152,787

[22] Filed: Feb. 5, 1988

[51] Int. Cl.⁴ .............................................. B60H 1/32
[52] U.S. Cl. .......................................... 62/89; 62/744; 62/DIG. 16; 98/211; 165/42; 237/45
[58] Field of Search ............... 62/244, DIG. 16, 239, 62/89; 237/45; 98/2.11, 2.14, 2.15; 165/42

[56] References Cited

U.S. PATENT DOCUMENTS

| | | | |
|---|---|---|---|
| 2,054,350 | 9/1936 | Weiland | 62/244 |
| 2,123,076 | 7/1938 | Madden | 62/244 |
| 2,182,569 | 12/1939 | Peo | 62/244 |
| 2,185,034 | 12/1939 | Melcher | 62/244 |
| 2,192,221 | 3/1940 | Brown | 165/42 X |
| 2,320,596 | 6/1943 | Henney | 98/10 |
| 2,443,472 | 6/1948 | Mayo et al. | 62/244 |
| 2,552,819 | 5/1951 | Schywarzmayr | 62/244 |
| 2,696,084 | 12/1954 | Kirkpatrick | 62/239 |
| 2,774,227 | 12/1956 | Schjolin et al. | 62/244 |
| 3,173,274 | 3/1965 | Dean | 62/244 |
| 3,173,275 | 3/1965 | Urian | 62/244 |
| 3,218,820 | 11/1965 | Spatt | 62/239 |
| 3,848,428 | 11/1974 | Rieter, Jr. | 62/285 |
| 3,885,398 | 5/1975 | Dawkins | 62/89 |
| 3,984,224 | 10/1976 | Dawkins | 62/89 |
| 4,043,143 | 8/1977 | Fluder et al. | 62/243 |
| 4,201,064 | 5/1980 | Krug et al. | 62/239 |
| 4,217,764 | 8/1980 | Armbruster | 62/323 |
| 4,473,109 | 9/1984 | Kojima et al. | 165/12 |
| 4,549,406 | 10/1985 | Ebner et al. | 62/241 |
| 4,551,986 | 11/1985 | Anderson et al. | 62/239 |
| 4,592,207 | 6/1986 | Rummel | 62/244 |
| 4,608,834 | 9/1986 | Rummel | 62/244 |
| 4,622,831 | 11/1986 | Grupa | 62/244 |
| 4,641,502 | 2/1987 | Aldrich et al. | 62/244 |

FOREIGN PATENT DOCUMENTS 55-1231 1/1980 Japan .
58-4622 1/1983 Japan .

Primary Examiner—William E. Tapolcal
Attorney, Agent, or Firm—D. R. Lackey

[57] ABSTRACT

An air conditioning unit (12) for a bus (10) which includes a roof mounted evaporator (36) having first and second transversely spaced evaporator sections (38, 40). Head room in the bus (10) is preserved while reducing noise in a passenger compartment (28) by employing first and second evaporator air flow paths (73, 75, 77, 79, 81) which respectively include drawing air via first and second blowers (52, 54) (1) vertically upward between the spaced evaporator sections through a return air grille (50) which is in substantially the same plane as the ceiling (30) of the passenger compartment (28), (2) transversely through the first and second spaced evaporator sections (38, 40) towards the sides (16, 18) of the bus (10), and (3) longitudinally from the first and second spaced evaporator sections (38, 40) towards the rear (14) of the bus (10) and into the first and second blowers (52, 54), and discharging the air transversely from the first and second blowers (52, 54) towards the sides (16, 18) of the bus (10) and into air outlet ducts (70, 72).

9 Claims, 4 Drawing Sheets

BUS AIR CONDITIONING UNIT

TECHNICAL FIELD

The invention relates in general to air conditioning methods and apparatus, and more specifically to air conditioning units suitable for mounting on the top of a bus.

BACKGROUND ART

Air conditioning units for buses often require that the evaporator and condenser sections thereof mount in the rear roof area of a bus without detracting from passenger head room in the passenger compartment, without significantly increasing the height of the bus, and without unduly complicating normal service procedures. These requirements are coupled with an additional restraint when the bus has a rear window, as the bus air conditioning unit must not interfere with rear window area. Also, the air in the passenger compartment is directed through a closed air flow path which includes the bus air conditioning unit, and it is then returned to the passenger compartment after conditioning. This flow path includes an evaporator and air moving means such as a blower. Noise generated in the closed air flow path by the air moving means should be prevented from entering the passenger compartment.

Thus, it would be desirable, and it is the object of the invention, to provide a new bus air conditioning unit, and to provide new methods of directing air through the bus air conditioning unit, which meet all the above stated requirements.

DISCLOSURE OF THE INVENTION

Briefly, the present invention relates to a method, and air conditioning apparatus for performing the method, of directing air from the passenger compartment through a roof mounted evaporator of an air conditioning unit, and returning conditioned air to the passenger compartment via first and second air delivery ducts in the bus. The method includes the steps of dividing the evaporator into first and second transversely spaced evaporator sections, and disposing the first and second evaporator sections above the ceiling liner of the passenger compartment. First and second blowers are respectively disposed between the first and second evaporator sections and the rear of the bus. The blowers draw air from the passenger compartment vertically upward through a return air grille which is in substantially the same plane as the ceiling of the passenger compartment. The vertically rising air is then directed through first right angle turns towards the two sides of the bus, ie., transverse to a longitudinal axis of the bus, through the first and second spaced evaporator sections. First and second plenums then turn the air through second right angle turns towards the rear of the bus, i.e., parallel with the longitudinal axis of the bus, into axially located inlets of the first and second blowers. The first and second blowers turn the air through third right angle turns towards the sides of the bus, where peripherally located blower outlets direct the air into air outlet ducts. The air outlet ducts again turn the air through fourth right angle turns towards the front of the bus, where it enters the bus air distribution system or ducts for for distribution into the passenger compartment. The plurality of right angle turns absorb the noise of the blower and its power source, preventing any objectionable noise from being delivered into the passenger compartment along with the conditioned air.

In addition to the desirable air flow paths for the return air and the conditioned air, the invention provides a desirable layout for the condenser and the associated condenser fans which enables two electric motors to be used to drive the two blowers and the two fans. The condenser is disposed behind the evaporator, between the evaporator and the rear of the bus, and also between the first and second blowers. The condenser has an air inlet plane which is adjacent to the plane of the bus roof, enabling it to be cleaned by rain and bus washing equipment. First and second condenser fan blades are disposed in spaced relation behind the first and second blowers, respectively, with the fan blades being in, or closely adjacent to, the back plane of the bus. The spaced first blower and first fan have their rotational axes aligned with one another, parallel with the longitudinal axis of the bus, and a first electric motor having a double shaft extension is disposed in the space and directly connected to the first blower and first fan. A second electric motor is similarly directly connected to the second blower and second fan. The first and second motors are preferably continuously operated during ventilating, heating and cooling modes of the air conditioning unit, for long motor life.

All refrigeration components required to complete a refrigeration circuit with the evaporator and condenser, and all electrical controls for operating the air conditioning unit, are disposed for easy access from the rear of the bus, or from the passenger compartment by removing the return air grille, making it unnecessary for service personnel to gain access to the top of the bus for routine servicing. Removable covers protect the blowers, fans and motors from the elements, while providing quick access for servicing.

BRIEF DESCRIPTION OF THE DRAWING

The invention may be better understood and further advantages and uses thereof more readily apparent when considered in view of the following detailed description of exemplary embodiments, taken with the accompanying drawings, in which.

DESCRIPTION OF PREFERRED EMBODIMENTS

Figure 1:
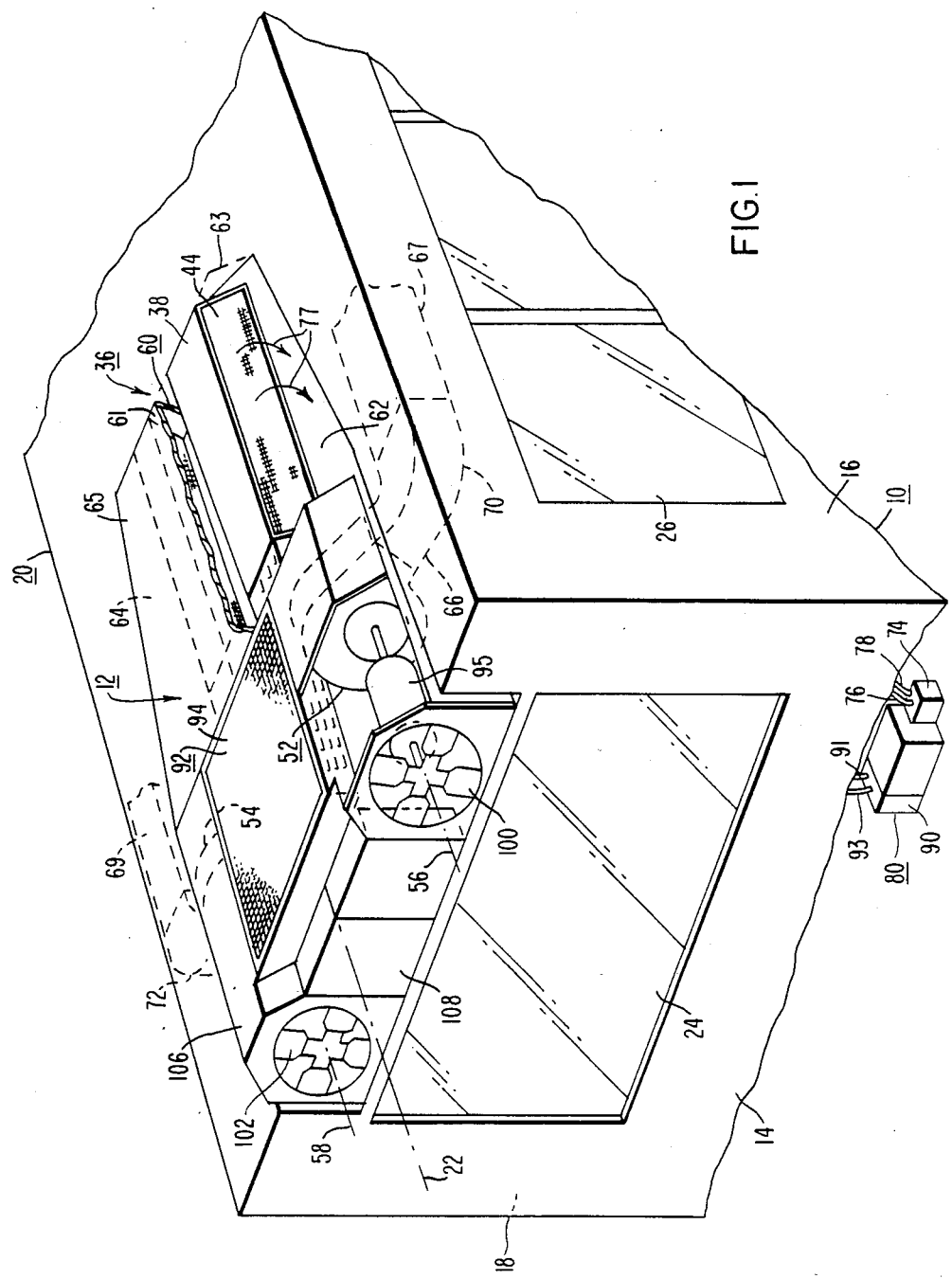
FIG. 1 is a perspective view of an air conditioning unit constructed according to the teachings of the invention installed in the rear roof area of a bus, with parts of the air conditioning unit cut away or shown in dotted outline to illustrate the components thereof.
Figure 3:
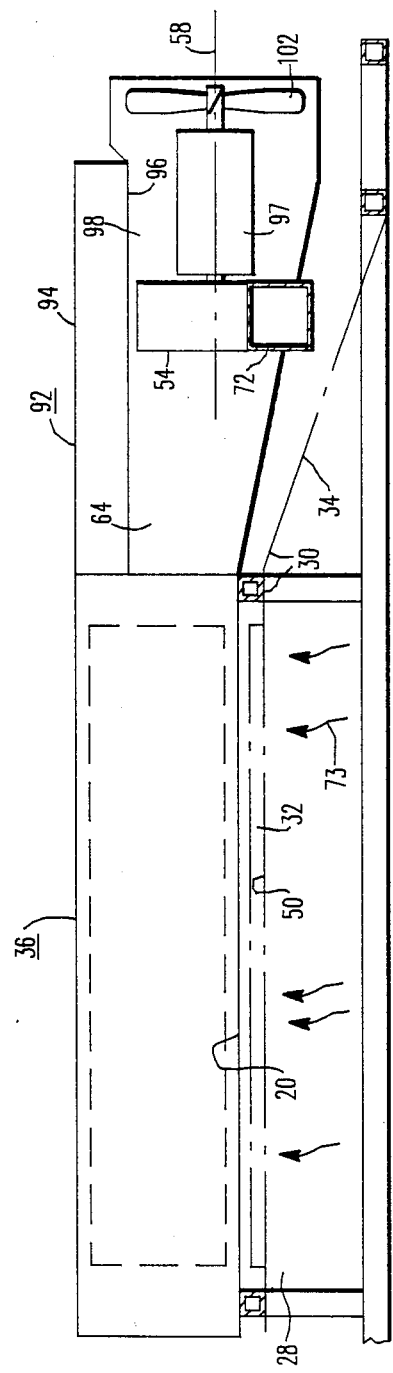
FIG. 3 is a side elevational view of the air conditioning unit shown in FIG. 1.

Referring now to the drawings, and to FIG. 1 in particular, there is shown a perspective view of a bus 10 having a roof top air conditioning unit 12 constructed according to the teachings of the invention. Bus 10 includes a front (not shown), a rear 14, first and second sides 16 and 18, a roof 20, and a longitudinal axis 22 which extends between the front and rear of the bus 10. Bus 10 additionally has a rear window 24, as well as windows on the sides, such as window 26 on side 16. The side elevational view of air conditioning unit 12 shown in FIG. 3 illustrates a passenger compartment 28 and a ceiling liner 30. Ceiling liner 30 includes a horizontal portion 32 which extends towards the rear 14 of the bus and then terminates in a downwardly sloping portion 34 which continues the ceiling liner 30 to the back of the bus, terminating above the rear window 24. The restraint on increasing the bus height, due to essential clearances that must be maintained between the bus and overhead objects, mandates a maximum dimension of about eight inches (20 cm) above the roof 20, and the present invention efficiently utilizes this allowable space, without reducing passenger head room in the passenger compartment 28.

Figure 2:
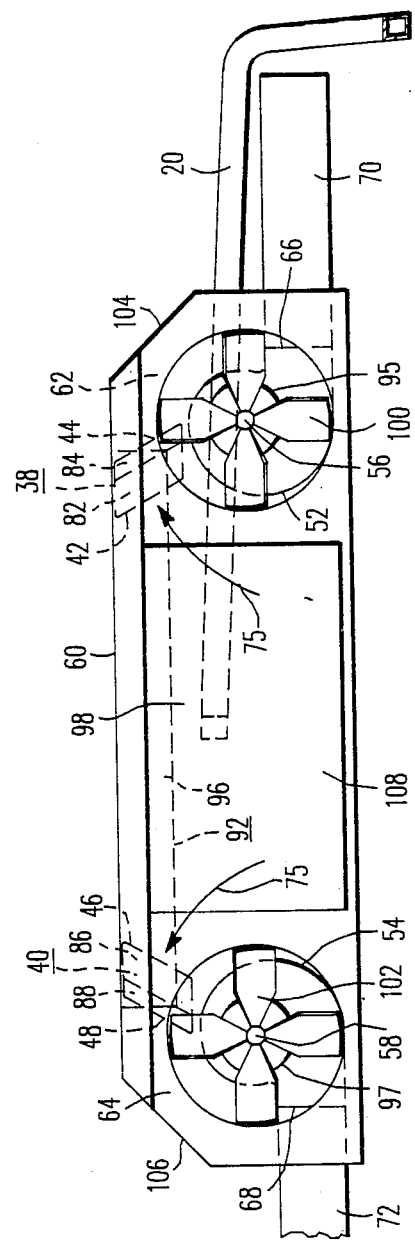
FIG. 2 is a rear elevational view of the air conditioning unit shown in FIG. 1.

More specifically, air conditioning unit 12 includes an evaporator 36 which is disposed above the horizontal portion 32 of the ceiling liner 30. Evaporator 36 is divided into first and second evaporator sections 38 and 40, respectively, and the first and second evaporator sections 38 and 40 are transversely spaced apart relative to the longitudinal axis 22. Each evaporator section has air inlet and outlet planes which extend in a direction parallel with the longitudinal axis 22 of the bus, such as air inlet and outlet planes 42 and 44, respectively, on evaporator section 38, and air inlet and outlet planes 46 and 48, respectively, on evaporator section 40. As best shown in FIG. 2, which is a rear elevational view of air conditioning unit 12, instead of the air inlet and outlet planes being vertically oriented, they are skewed from the vertical by a predetermined angle, such as 30 degrees, for example, such that extensions of the inlet and outlet planes of one evaporator section intersect the inlet and outlet planes of the outer evaporator section above roof 20. This arrangement increases the surface areas of the air inlet and outlet planes for a given vertical dimension of the evaporator sections, and the inverted vee configuration formed by the skewed evaporator sections facilitates redirecting rising return air from the passenger compartment through the evaporator sections 38 and 40.

The ceiling liner portion 32 which is below and between the spaced evaporator sections 38 and 40 is removed and covered by a return air grille 50, as shown in FIG. 3, and a filter (not shown) may be disposed above grille 50. Grille 50 is substantially in the same plane as ceiling liner portion 32, and thus does not project into the passenger compartment 28.

First and second centrifugal blowers 52 and 54, respectively, are mounted behind and slightly outboard from evaporator sections 38 and 40, respectively, in the expanding space created by the downwardly sloping portion 34 of the ceiling liner 30. The rotational axes 56 and 58 of blowers 52 and 54, respectively, are oriented parallel with the longitudinal axis 22 of bus 10, and they are generally aligned with the air outlet planes 44 and 48 of evaporator sections 38 and 40, respectively.

A housing 60 is disposed about evaporator sections 38 and 40. Housing 60 has a central portion 61 which insures that return air from the bus passenger compartment 28 is drawn into the air inlet planes 42 and 46 of evaporator sections 38 and 40. Housing 60 also has outboard portions 63 and 65 which form plenums 62 and 64, respectively, which insure that air which has passed through evaporator sections 38 and 40 is drawn from the air outlet planes 44 and 48 to the axially located inlets of blowers 52 and 54.

Peripherally located outlets 66 and 68 of blowers 52 and 54 are connected to air outlet ducts 70 and 72, respectively, which direct air outwardly towards the sides 16 and 18 of bus 10 and then through smoothly curved right angle bends to bus air delivery ducts 67 and 69 located in passenger compartment 28.

Figure 4:
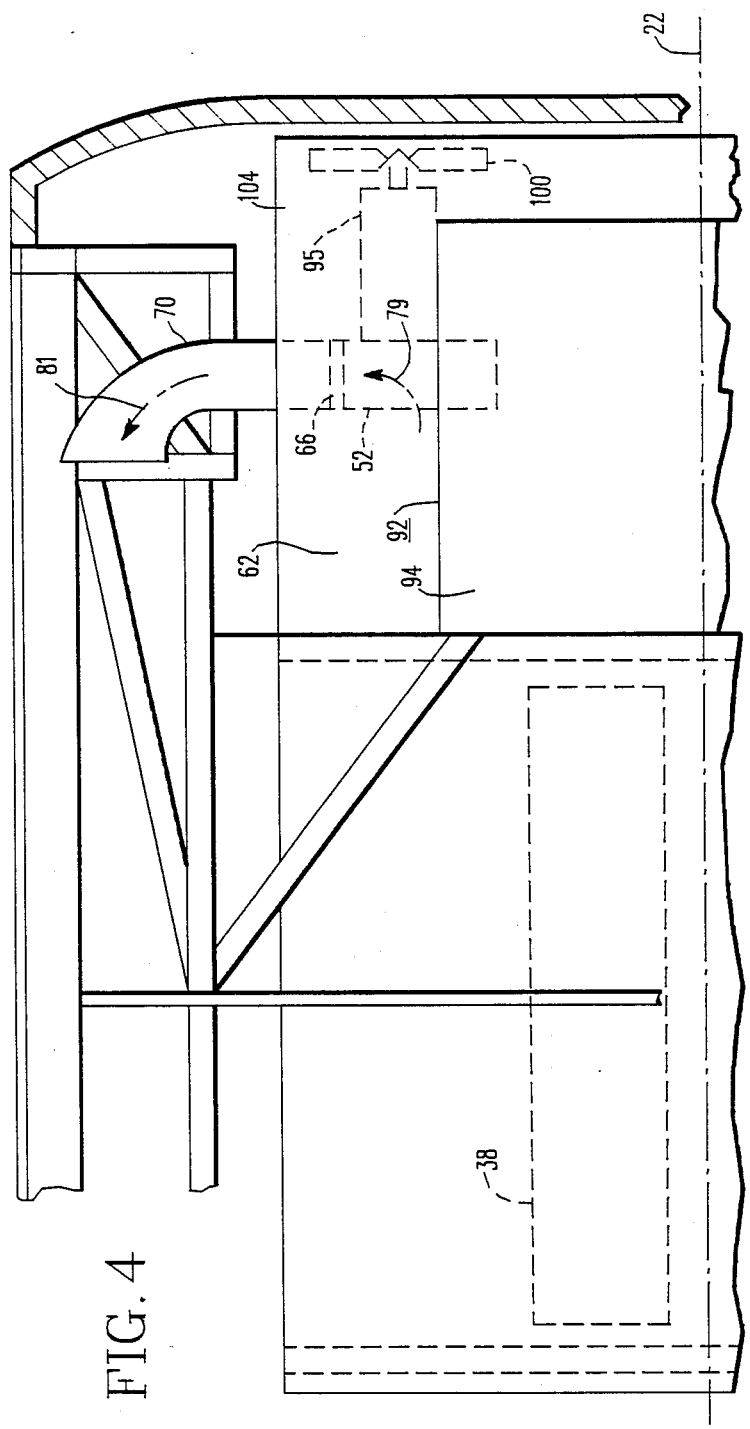
FIG. 4 is a plan view of the air conditioning unit shown in FIG. 1.

The hereinbefore described air flow arrangement does not diminish passenger head room in passenger compartment 28, and it provides an air flow path for conditioning the air in passenger compartment 28 which reduces air borne noise to an insignificant level. The noise reducing arrangement is provided by a new air flow method which includes directing the air through a plurality of right angle turns which absorb the noise, and prevent it from being transmitted to the passenger compartment 28 in either direction from blowers 52 and 54. In other words, noise cannot enter passenger compartment 28 via the openings defined by the return air grille 50, or via the passenger compartment air ducts 67 and 69. In this new air flow method, blowers 52 and 54 draw air from passenger compartment 28 vertically upward through the return air grille 50, as indicated by arrows 73 in FIG. 3. Housing portion 61 of housing 60 directs the return air into first right angle turns transverse to the longitudinal axis 22 of bus 10, i.e., towards sides 16 and 18, into the skewed air inlet planes 42 and 46 of evaporator sections 38 and 40, as indicated by arrows 75 in FIG. 2. The return air is conditioned in evaporator sections 38 and 40, and it exits therefrom via the air outlet planes 44 and 48 into plenums 62 and 64. Housing portions 63 and 65 of housing 60 direct the conditioned air through second right angle turns into longitudinal flow paths towards the rear 14 of bus 10, i.e., paths which are parallel with bus axis 22, as indicated by arrows 77 in FIG. 1. The conditioned air is drawn into the axial inlets of blowers 52 and 54 and the blowers redirect the air through third right angle turns towards the sides 16 and 18 of bus 10, as indicated by arrows 79 in FIG. 4. The peripherally located outlets 66 and 68 of blowers 52 and 54 are connected to air outlet ducts 70 and 72 which direct the air through fourth right angle turns into the longitudinally extending air delivery ducts 67 and 69 of the bus 10, as indicated by arrow 81 in FIG. 4. Air leaving the air delivery ducts to enter the passenger compartment 28 again must proceed through right angle turns, further isolating the noise producing blowers 52 and 54 from the passenger compartment 28.

In addition to the evaporator 36, the refrigerant circuit includes a compressor 74, shown in FIG. 1, having a hot gas line 76 and a suction line 78. Compressor 74 may be driven by the bus engine, shown generally at 80, which is mounted at the lower rear of bus 10. As illustrated most clearly in FIG. 2, each evaporator section 38 and 40 may have a cooling portion and a heating portion, such as cooling and heating portions 82 and 84 in evaporator section 38, and cooling and heating portions 86 and 88 in evaporator section 40. The cooling portions 82 and 86 are connected in the refrigeration circuit, which includes compressor 74, and the heating portions 84 and 88 may be connected to receive hot liquid coolant from a radiator 90 associated with the bus engine 80, as indicated by hot liquid coolant lines 91 and 93. Blowers 52 and 54 are driven by power sources, such as electric motors 95 and 97. In the bus air conditioning unit 12, which combines the cooling and heating requirements in evaporator 36, motors 95 and 97 may be operated continuously while bus 10 is in service, to provide cooling, heating, or ventilation, extending the life of the motors.

The refrigerant circuit additionally includes a condenser 92. Condenser 92 is located behind evaporator 36, i.e., between evaporator 36 and the rear 14 of bus 10, between blowers 52 and 54, and essentially above the sloping portion 34 of the ceiling liner 30. Condenser 92 has air inlet and outlet planes 94 and 96, respectively. Air inlet plane 94 is horizontally oriented and is located in substantially the same plane as the housing 60 which covers the evaporator sections 38 and 40, i.e., as high as the maximum height profile allow. This location provides unimpeded fresh air flow into condenser 92, it assures self cleaning due to rain, as well as cleaning by bus wash solutions, and it provides sufficient clearance below the air outlet plane 96 to provide a plenum 98 for containing heated ambient air and directing it to an exit along the back plane of the bus 10.

Air is drawn into the air inlet plane 94 of condenser 92 via first and second fan blades 100 and 102, respectively, with fan blades 100 and 102 being driven by suitable power sources. In a preferred embodiment of the invention, the rotational axes of the fan blades are aligned with rotational axes 56 and 58 of blowers 52 and 54, and motors 95 and 97 are provided with double shaft extensions, one for a blower and one for a fan blade. Thus, motor 95 drives evaporator blower 52 and condenser fan blade 100, and motor 97 drives evaporator blower 54 and fan blade 102. Fan blades 100 and 102, being located in the back plane of rear portion 14 of bus 10, project fan noise outwardly from the rear of the bus, isolating passenger compartment 28 from any noise produced by the condenser fans.

Removable housings or covers 104 and 106 provide the functions of protecting motors 92 and 94, respectively, from rain and bus wash solutions, as well as providing quick access to the motors and other refrigeration circuit components, such as fittings, valves, drier, and receiver, for maintenance purposes. Covers 104 and 106 are easily reached from the rear of the bus via a service dolly.

Electrical controls for controlling the air conditioning unit 12, as well as refrigeration circuit components, are disposed in a cabinet 108 disposed between condenser fans 100 and 102, thus preserving the concept that all electrical control and all refrigeration components, except the evaporator and condenser coils, are accessible and serviceable from the rear 14 of the bus 10, or by removing the return air grille 50 in the passenger compartment 28. The compressor 74 is in the engine compartment at the rear 14 of bus 10, and is also easily serviced.

I claim:

1. In a bus having a front, a rear having a back plane, a longitudinal axis which extends between said front and rear, a roof, and a passenger compartment having a ceiling, a method of directing air from the passenger compartment through a roof mounted evaporator of an air conditioning unit, and returning conditioned air to the passenger compartment via first and second air delivery ducts, comprising the steps of:
    dividing the evaporator into first and second transversely spaced evaporator sections, relative to the longitudinal axis of the bus,
    providing an air inlet grille below and between said first and second spaced evaporator sections, substantially in the plane of the ceiling of the passenger compartment,
    providing first and second blowers between said first and second evaporator sections, respectively, and the rear of the bus,
    drawing air from the bus:
        (1) vertically upward through said air inlet grille,
        (2) transversely, relative to the longitudinal axis of the bus, through said first and second evaporator sections, and
        (3) parallel with the longitudinal axis of the bus into said first and second blowers,
    discharging air from said first and second blowers transversely, relative to the longitudinal axis of the bus, into the first and second air delivery ducts,
    disposing a refrigerant condenser between the evaporator and the rear of the bus, and between the first and second blowers, with said condenser having a horizontally oriented air inlet plane adjacent to the plane of the bus roof,
    disposing first and second condenser fans substantially in the back plane of the bus,
    driving the first blower and first fan via a first common power source,
    driving the second blower and second fan via a second common power source,
    drawing air through said refrigerant condenser,
    and discharging the air drawn through the refrigerant condenser from the back plane of the bus via said first and second fans.

2. The method of claim 1 wherein the first and second evaporator sections each have air inlet planes spaced from one another, and including the step of:
    orienting the air inlet planes such that extensions thereof intersect above the roof of the bus, to increase the areas of the air inlet planes, compared with a vertical orientation thereof, without increasing the vertical dimensions of the first and second evaporator sections.

3. The method of claim 1 including the step of:
    operating the first and second common power sources continuously while the bus is in service.

4. The method of claim 1 wherein the first and second common power sources are electrical motors having double ended drive shafts, and including the step of:
    orienting the drive shafts of the electrical motors parallel with the longitudinal axis of the bus.

5. The method of claim 1 including the step of:
    disposing electrical and refrigerant components such that, other than the evaporator and condenser, all may be accessed from either the passenger compartment or the rear of the bus.

6. In an air conditioning unit for a bus, wherein the bus has front, side, rear and roof portions, a longitudinal axis which extends between the front and rear portions, a passenger compartment having a ceiling, and first and second air delivery ducts in the passenger compartment, comprising:
    an evaporator disposed above the passenger ceiling,
    said evaporator having first and second evaporator sections spaced transversely relative to the longitudinal axis of the bus,
    a return air grille disposed below and between said first and second spaced evaporator sections, substantially in the plane of the ceiling of the passenger compartment,
    first and second evaporator blowers each having an inlet, and outlet and a rotational axis,
    first and second air outlet ducts,
    said first and second evaporator blowers being respectively disposed between the first and second evaporator sections and the rear of the bus, with their rotational axes substantially parallel with the longitudinal axis of the bus, and with their outlets connected to said first and second air outlet ducts, respectively, 7. The air conditioning unit of claim 6 wherein the first and second evaporator sections have inlet planes oriented such that extensions of the planes intersect above the roof portion of the bus.

8. The air conditioning unit of claim 6 wherein the first and second blowers and first and second fans each have a rotational axis aligned parallel with the longitudinal axis of the bus.

9. The air conditioning unit of claim 6 including refrigeration components required to complete an operative refrigeration circuit with the evaporator and condenser, and electrical controls for controlling the air conditioning unit, with said refrigeration components and electrical controls being mounted for access from the passenger compartment or from the rear of the bus.

* * * * *